(12) United States Patent
Noorsumar et al.

(10) Patent No.: US 10,257,685 B1
(45) Date of Patent: Apr. 9, 2019

(54) SYSTEM AND METHOD TO GENERATE AND TRANSMIT AN EMERGENCY SERVICES REQUEST

(71) Applicant: GM GLOBAL TECHNOLOGY OPERATIONS LLC, Detroit, MI (US)

(72) Inventors: Gulshan Noorsumar, Bangalore (IN); Tyler Bitterman, Plymouth, MI (US)

( * ) Notice: Subject to any disclaimer, the term of this patent is extended or adjusted under 35 U.S.C. 154(b) by 0 days.

(21) Appl. No.: 16/117,009

(22) Filed: Aug. 30, 2018

(51) Int. Cl.
*H04W 4/90* (2018.01)
*H04W 4/02* (2018.01)
*H04W 4/44* (2018.01)

(52) U.S. Cl.
CPC .............. *H04W 4/90* (2018.02); *H04W 4/02* (2013.01); *H04W 4/44* (2018.02)

(58) Field of Classification Search
CPC . H04W 76/40; H04W 56/0025; H04W 76/50; H04W 4/90; H04W 4/44; H04W 4/02
See application file for complete search history.

(56) References Cited

U.S. PATENT DOCUMENTS

| 6,292,687 | B1 | 9/2001 | Lowell |
| 9,610,913 | B2 | 4/2017 | Narita |
| 9,809,187 | B2 | 11/2017 | Yamaguchi |
| 2015/0274118 | A1* | 10/2015 | Schondorf ............ B60R 19/483 701/45 |
| 2018/0144615 | A1* | 5/2018 | Kinney .............. G06K 9/00362 |

OTHER PUBLICATIONS

Karlsson, J. (2017). *Define_Pressure_Tube: A pressure tube sensor for pedestrian crash simulation [Power Joint Slides]. Retrieved from https://www.dynamore.de/de/download/papers/2016-Is-dyna-forum/Papers%202016/montag-10.10.16/safety-airbags-and-pressure-tubes/define_pressure_tube-a-pressure-tube-sensor-for-pedestrian-cash.

* cited by examiner

*Primary Examiner* — Christopher M Brandt
*Assistant Examiner* — Jing Gao

(57) ABSTRACT

One general aspect includes a system to generate and transmit an emergency services request, the system including: a memory configured to include one or more executable instructions and a controller configured to execute the executable instructions, where the executable instructions enable the controller to: receive an indication of a pedestrian crash incident; and in response to the pedestrian crash incident indication, generate and transmit an emergency services request.

17 Claims, 2 Drawing Sheets

SYSTEM AND METHOD TO GENERATE AND TRANSMIT AN EMERGENCY SERVICES REQUEST

INTRODUCTION

In today's traffic congestion, accidents are bound to occur. For example, pedestrians walking across busy streets or other crowded urban areas are prone to being struck by the oncoming vehicular traffic. What's worse, in certain instances, absent minded drivers can hit someone without caring to inform emergency services providers such as the nearest hospital, police station, or fire department. They will just leave their victim at the scene of the accident, making the pedestrian tend to their wounds and/or get help from an innocent bystander. Accordingly, it is desirable to provide a system and method that can cause a vehicle to automatically transmit an emergency services request after crashing into a pedestrian. Such a system and method will ensure an injured pedestrian will get help, even when they are the victim of a hit-and-run. Furthermore, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to generate and transmit an emergency services request, the method including: receiving, at a controller, an indication of a pedestrian crash incident; in response to the pedestrian crash incident indication, via a controller, generating an emergency services request; and transmitting, via the controller, the emergency services request. Other embodiments of this aspect include corresponding computer systems, apparatus, and computer programs recorded on one or more computer storage devices, each configured to perform the actions of the methods.

Implementations may include one or more of the following features. The method where the controller is located in a vehicle. The method where the pedestrian crash incident indication is received from a pedestrian collision detection sensor located in a bumper of the vehicle. The method where the emergency services request includes vehicle location data. The method where the emergency services request includes collision speed data. The method where the emergency services request is sent to a network participant via a peer network. The method where the network participant is an emergency services provider or call center. Implementations of the described techniques may include hardware, a method or process, or computer software on a computer-accessible medium.

One general aspect includes a system to generate and transmit an emergency services request, the system including: a memory configured to include one or more executable instructions and a controller configured to execute the executable instructions, where the executable instructions enable the controller to: receive an indication of a pedestrian crash incident; and in response to the pedestrian crash incident indication, generate and transmit an emergency services request. Other embodiments of this aspect include corresponding computer systems, apparatus, and computer programs recorded on one or more computer storage devices, each configured to perform the actions of the methods.

Implementations may include one or more of the following features. The system where the memory and controller are located in a vehicle. The system where the pedestrian crash incident indication is received from a pedestrian collision detection sensor located in a bumper of the vehicle. The system where the emergency services request includes vehicle location data. The system where the emergency services request includes collision speed data. The system where the emergency services request is transmitted to a network participant via a peer network. The system where the network participant is an emergency services provider or call center. Implementations of the described techniques may include hardware, a method or process, or computer software on a computer-accessible medium.

One general aspect includes a non-transitory and machine-readable medium having stored thereon executable instructions adapted to generate and transmit an emergency services request, which when provided to a controller and executed thereby, causes the controller to: receive an indication of a pedestrian crash incident; and in response to the pedestrian crash incident indication, generate and transmit an emergency services request. Other embodiments of this aspect include corresponding computer systems, apparatus, and computer programs recorded on one or more computer storage devices, each configured to perform the actions of the methods.

Implementations may include one or more of the following features. The non-transitory and machine-readable memory where the controller is located in a vehicle. The non-transitory and machine-readable memory where the pedestrian crash incident indication is received from a pedestrian collision detection sensor located in a bumper of the vehicle. The non-transitory and machine-readable memory where the emergency services request includes vehicle location data. The non-transitory and machine-readable memory where the emergency services request includes collision speed data. The non-transitory and machine-readable memory where the emergency services request is transmitted to an emergency services provider or call center via a peer network. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
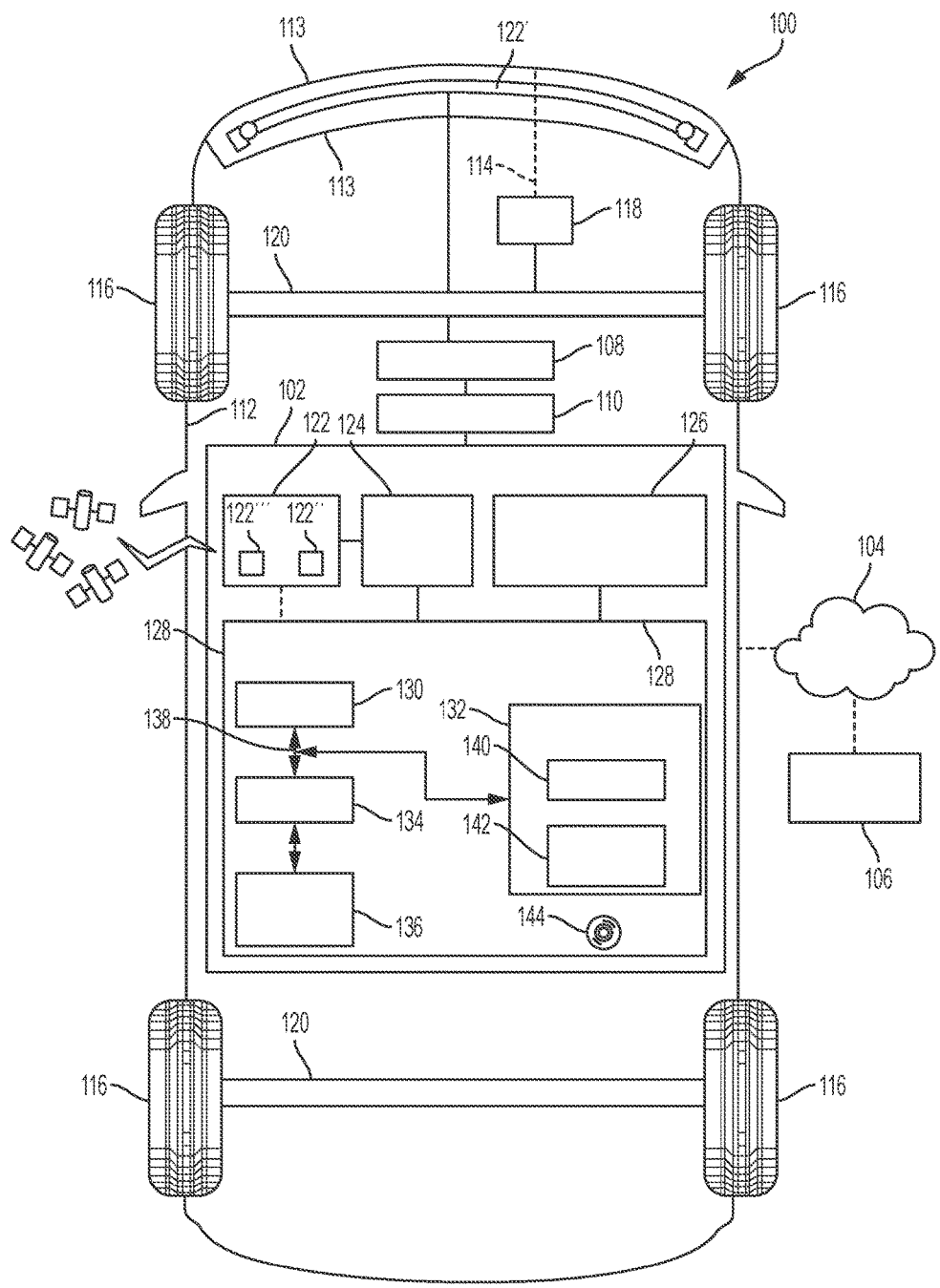
FIG. 1 is a functional block diagram of a vehicle that includes a control system for controlling and implementing a system and method to automatically transmit an emergency services request after a pedestrian crash incident in accordance with one or more exemplary embodiments.

FIG. 1 illustrates a vehicle 100, according to an exemplary embodiment. As described in greater detail further below, the vehicle 100 includes a control system 102 to automatically transmit an emergency services request after the occurrence of a pedestrian crash incident. In various embodiments, the control system 102 facilitates communications between the vehicle 100 and a peer network 104 having various other participants 106. Also in various embodiments, the control system 102 is coupled to various vehicle modules 108 (e.g., braking control, engine control, transmission control, instrument pack, infotainment module, passive entry passive start module (PEPS module), body control module (BCM), audio system, lighting, climate control, and so on, in certain embodiments) via one or more vehicle buses 110 (e.g., one or more vehicle CAN buses, in certain embodiments).

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, and/or one or more other types of mobile platforms (e.g., a robot, a ship, and so on) and/or other systems.

The vehicle 100 includes a body 112 that is arranged on a chassis 114. The body 112 substantially encloses other components of the vehicle 100 and includes a front bumper 113. The body 112 and the chassis 114 may jointly form a frame. The vehicle 100 also includes a plurality of wheels 116. The wheels 116 are each rotationally coupled to the chassis 114 near a respective corner of the body 112 to facilitate movement of the vehicle 100. In one embodiment, the vehicle 100 includes four wheels 116, although this may vary in other embodiments (for example for trucks and certain other vehicles).

A drive system 118 is mounted on the chassis 114, and drives the wheels 116, for example via axles 120. The drive system 118 preferably comprises a propulsion system. In certain exemplary embodiments, the drive system 118 comprises an internal combustion engine and/or an electric motor/generator, coupled with a transmission thereof. In certain embodiments, the drive system 118 may vary, and/or two or more drive systems 118 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments, the control system 102 controls communications with the peer network 104, for example for use in performing actions respect to one or more modules 108 of the vehicle 100 (e.g., vehicle braking, body control, engine control, transmission control, infotainment control, climate control, lighting control, audio system control, instrument control, and so on), among other vehicle actions. Also in various embodiments, the control system 102 is disposed within the body 112 of the vehicle 100. In one embodiment, the control system 102 is mounted on the chassis 114. In certain embodiments, the control system 102 and/or one or more components thereof may be disposed outside the body 112, for example, on a remote server, in the cloud, or in a remote smart phone or other device where image processing is performed remotely. In addition, in certain embodiments, the control system 102 may be disposed within and/or as part of the vehicle modules 108, drive system 118, and/or within and/or or as part of one or more other vehicle systems. Also, as depicted in FIG. 1, in various embodiments the control system 102 is coupled to the vehicle modules 108 via the vehicle communication bus 110, and is further coupled to the peer network 104.

As depicted in FIG. 1, the control system 102 includes various sensors 122, a sensor interface 124, a transceiver 126, and a controller 128. In various embodiments, the sensors 122 include a pedestrian collision detection sensor (122'), a velocity sensor (122"), a vehicle location sensor (122'''), radar sensors, infrared sensors, engine control sensors, and/or various other sensors pertaining to the various modules 108 and/or operation of the vehicle 100. In various embodiments, the sensor interface 124 facilitates communications between the sensors 122 and the controller 128.

In various embodiments, the pedestrian collision detection sensor 122' (collision sensor 122') is generally known to include a pressure tube formed in an elongated shape, and a pair of pressure sensors at each end of the pressure tube which output signals according to a change in pressure in the pressure tube. Moreover, the pressure tube may be hollow structural body with a substantially circular ring-shaped cross-section using a silicon tube (or the like) and the pressure tube may be embedded in an absorber device (e.g., a urethane foam resin material disposed within the front bumper 113). The pressure sensors are also electrically connected to controller 128 and signals are output from these pressure sensors to the controller 128 according to the change in pressure inside the pressure tube (i.e., when the pressure tube deforms). The velocity sensor 122" is electrically connected to the controller 128 and the velocity sensor 122" outputs a signal according to collision speed with a colliding body to the controller 128. The vehicle location sensor 122''' is a GPS module that receives radio signals from a constellation of GPS satellites 123. From these signals, the location sensor 122''' can determine vehicle position that is used for providing navigation and other position-related services.

In various embodiments, the transceiver 126 facilitates and provides communications between the vehicle 100 and the peer network 104. For example, in various embodiments, the transceiver 126 provides communications (e.g., including data pertaining to operation of the vehicle 100 and/or including recommendations for the vehicle 100) to the peer network 104 (e.g., from one or more other network participants 106 such as, for example, remote mobile computing devices (e.g., smart phones, tablets, wearable devices and the like) or emergency service providers (i.e., a fire department, hospital or police station having uniformed or otherwise identified employees or contractors), or a call center (e.g., ONSTAR™)) and also receives communications from the peer network 104. In certain embodiments, the transceiver 126 may also receive, provide, and/or facilitate communications between the controller 128 and the sensors 122 and/or vehicle modules 108. In various embodiments, the transceiver 126 may include a single transceiver and/or multiple transceivers, and may include one or more similar devices such as one or more receivers, transmitters, and/or communication modules (which will collectively be referred to as a "transceiver" for the purposes of this Application).

The controller 128 controls operation of the control system 102, and the communications with the peer network 104. In various embodiments, the controller 128 is coupled to the sensors 122 (e.g., via the sensor interface 124), the transceiver 126, the vehicle modules 108 (e.g., via the vehicle bus 110), and to the peer network 104. In various embodiments, the control system 102 receives data from the sensors 122, the vehicle modules 108, and the peer network 104, processes the data, controls vehicle actions using the data via the vehicle modules 108, and controls the vehicle 100's communications with the peer network 104. In various embodiments, the controller 128 provides these and other functions in accordance with the steps of the processes discussed further below in connection with FIG. 2.

Also in one embodiment, the controller 128 is disposed within the control system 102, within the vehicle 100. In certain embodiments, the controller 128 (and/or components thereof, such as the processor 130 and/or other components) may be part of and/or disposed within one or more other vehicle components. Also in certain embodiments, the controller 128 may be disposed in one or more other locations of the vehicle 100. In addition, in certain embodiments, multiple controllers 128 may be utilized. In addition, in certain embodiments, the controllers 128 can be placed outside the vehicle, such as in a remote server, in the cloud or on a remote smart device.

As depicted in FIG. 1, the controller 128 comprises a computer system. In certain embodiments, the controller 128 may also include one or more of the sensors 122, the transceiver 126, one or more components thereof, and/or one or more other components of the vehicle 100. In addition, it will be appreciated that the controller 128 may otherwise differ from the embodiment depicted in FIG. 1. For example, the controller 128 may be coupled to or may otherwise utilize one or more remote computer systems and/or other control systems, for example as part of one or more of the above-identified vehicle 100 devices and systems.

In the depicted embodiment, the computer system of the controller 128 includes a processor 130, a memory 132, an interface 134, a storage device 136, and a bus 138. The processor 130 performs the computation and control functions of the controller 128, and may comprise any type of processor or multiple processors, single integrated circuits such as a microprocessor, or any suitable number of integrated circuit devices and/or circuit boards working in cooperation to accomplish the functions of a processing unit. During operation, the processor 130 executes one or more programs 140 contained within the memory 132 and, as such, controls the general operation of the controller 128 and the computer system of the controller 128, generally in executing the processes described herein, such as the processes discussed further below in connection with FIG. 2. While the processor 130 is depicted in FIG. 1 as being part of the controller 128, it will be appreciated that in certain embodiments the processor 130 (and/or one or more additional processors) may also be part of various other vehicle components, such as (by way of example) one or more vehicle modules 108 (e.g., an engine control unit), sensors 122, drive system 118, transceiver 126, and so on.

The memory 132 can be any type of suitable memory. For example, the memory 132 may include various types of dynamic random access memory (DRAM) such as SDRAM, the various types of static RAM (SRAM), and the various types of non-volatile memory (PROM, EPROM, and flash). In certain examples, the memory 132 is located on and/or co-located on the same computer chip as the processor 130. In the depicted embodiment, the memory 132 stores the above-referenced program 140 along with one or more stored values 142.

The bus 138 serves to transmit programs, data, status and other information or signals between the various components of the computer system of the controller 128. The interface 134 allows communication to the computer system of the controller 128, for example from a system driver and/or another computer system, and can be implemented using any suitable method and apparatus. In one embodiment, the interface 134 obtains the various data from the sensors 122, vehicle modules 108, and/or transceiver 126. The interface 134 can include one or more network interfaces to communicate with other systems or components. The interface 134 may also include one or more network interfaces to communicate with technicians, and/or one or more storage interfaces to connect to storage apparatuses, such as the storage device 136.

The storage device 136 can be any suitable type of storage apparatus, including various different types of direct access storage and/or other memory devices. In one exemplary embodiment, the storage device 136 comprises a program product from which memory 132 can receive a program 140 that executes one or more embodiments of one or more processes of the present disclosure, such as those set forth in FIG. 2 and discussed below. In another exemplary embodiment, the program product may be directly stored in and/or otherwise accessed by the memory 132 and/or a disk (e.g., disk 144), such as that referenced below.

The bus 138 can be any suitable physical or logical means of connecting computer systems and components. This includes, but is not limited to, direct hard-wired connections, fiber optics, infrared and wireless bus technologies. During operation, the program 140 is stored in the memory 132 and executed by the processor 130.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 130) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 128 may also otherwise differ from the embodiment depicted in FIG. 1, for example in that the computer system of the controller 128 may be coupled to or may otherwise utilize one or more remote computer systems and/or other control systems.

Method

Figure 2:
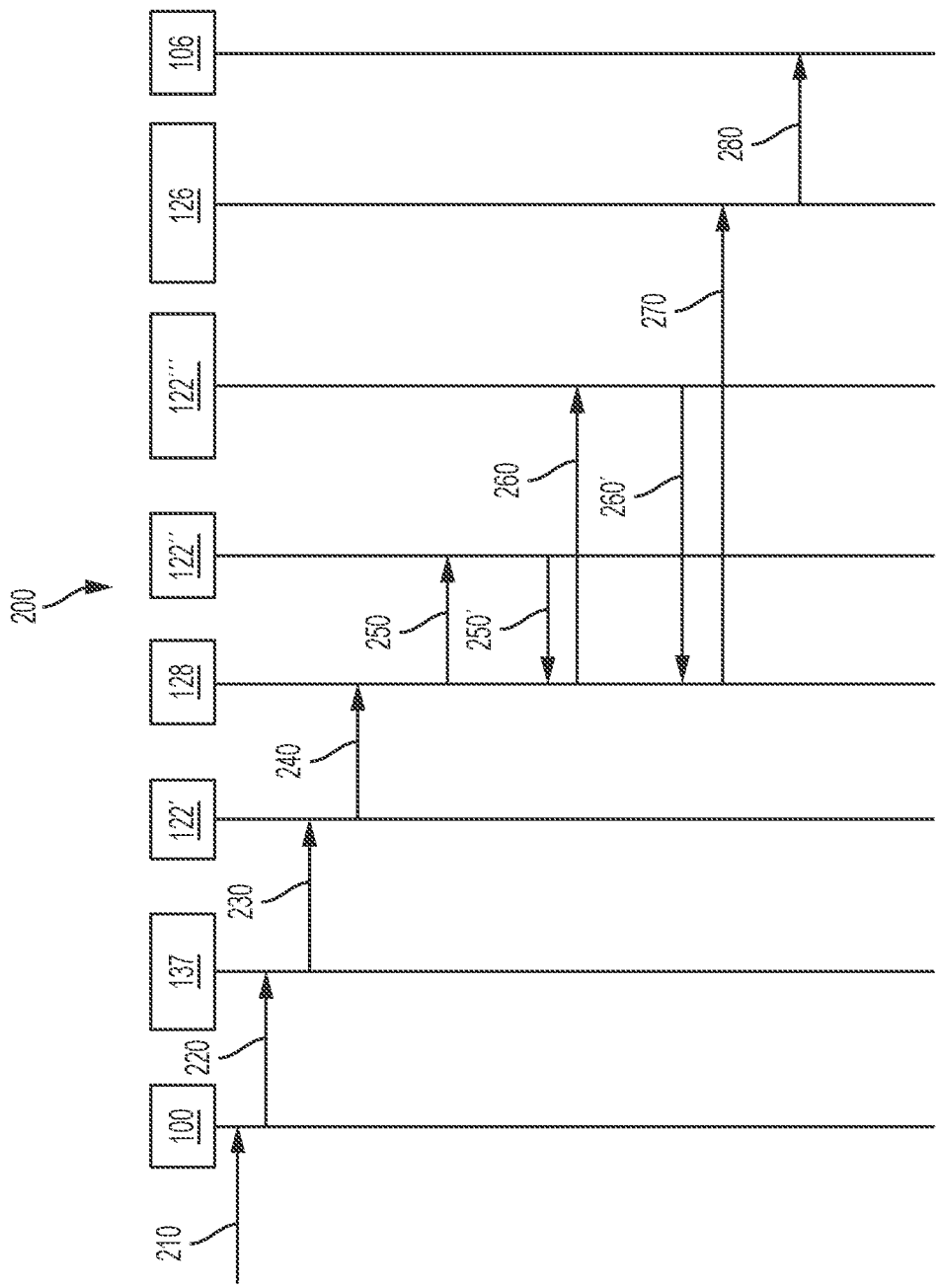
FIG. 2 is a flowchart of an exemplary process to automatically transmit an emergency services request after an indication of a pedestrian crash incident in accordance with one or more exemplary embodiments.

Now turning to FIG. 2, there is shown an embodiment of a method 200 to cause a vehicle to automatically transmit an emergency services request after an indication of a pedestrian crash incident. One or more aspects of pedestrian impact notification method 200 may be completed through controller 128 which may include one or more executable instructions incorporated into memory 132 and carried out by processor 130. One or more ancillary aspects of method 200 may be completed by peer network 104.

Method 200 is supported by control system 102 being configured to establish one or more communication protocols with peer network 104. This configuration may be established by a vehicle manufacturer at or around the time of the system's assembly or after-market (e.g., via vehicle download or at a time of vehicle service, just to name a couple of examples). In at least one implementation, one or more instructions are provided to the processor 130 and stored on non-transitory computer-readable medium (e.g., memory 132). This configuration may be established by a mobile computing device manufacturer at or around the time of the device's assembly.

Method 200 begins at 210 in which vehicle 100 is traversing along a path, from one location to another. At step 220, the vehicle 100 collides with a pedestrian 137 (i.e., person walking along a road or in a developed area) while the vehicle 100 is traversing along its designated path. During this collision, the front bumper 113 is pressed inwards and toward the rest of the vehicle's body 112 by the body mass of the pedestrian. The front bumper 113 thereby presses the absorber toward the body 112 and thus the absorber presses the pressure tube of collision sensor 122' while undergoing deformation to deform the pressure tube and change the pressure inside the pressure tube as a result.

In step 230, when the pressure inside the pressure tube sufficiently changes, the pressure sensors will output one or more signals corresponding to the pressure change to controller 128. In step 240, the controller 128 (via processor 130) will compute the collision load based on the output signals from the pressure sensors. In step 250, in response to this crash indication, the controller 128 inquires speed data from the velocity sensor 122" and in turn computes the collision speed based on the output signal (250') from the velocity sensor 122". The controller 128 then derives the effective mass of the pedestrian from the computed collision load and collision speed, verifies the effective mass exceeds the threshold value, and thus verifies that the body colliding with the front bumper 113 is in fact a pedestrian.

In step 260, upon verifying that a pedestrian has hit the vehicle 100, controller 128 will inquire location data from the vehicle location sensor 122''' and in turn compute the vehicle's 100 location at the time of impact (vehicle location) based on the output signal (260') from the vehicle location sensor 122'''. In step 270, in response to this pedestrian crash incident indication, controller 128 will compile, amongst other information, the computed collision speed and the vehicle location into an emergency services request. Moreover, in this step, controller 128 will collaborate with transceiver 126 to prepare to transmit this request to at least one network participant 106 of the peer network 104.

In step 280, controller 128 will command the transceiver 126 to transmit the emergency services request to the network participant(s) 106. For example, the emergency services request may be transmitted to an emergency services provider 106 (e.g., an emergency services dispatch for a hospital, police station, fire department, or some other emergency medical technician group) or to a call center 106 (e.g., ONSTAR™) to request help be provided for the injured pedestrian. This request will also let a responding emergency services provider(s) and/or the authorities know where the pedestrian was struck by the vehicle 100 and how fast the vehicle 100 was moving when the incident occurred.

The emergency services request may also include additional information such as, but not limited to, basic vehicle information (make/model) so that the responding emergency services provider(s) 106 and/or call center 106 can get a better understanding of the damage that may have incurred from the incident. It should be understood that this emergency services request can be automatically sent to the network participant(s) 106 without any activation input made by an operator or passenger of the vehicle 100. It should also be understood that this emergency services request can be sent to the network participant(s) 106 after the vehicle 100 has departed from the scene of the accident and when the controller 128 has yet to recognize that the vehicle operator (or one or more passengers) have placed a phone call to the network participant(s) 106 (or some other emergency services provider or dispatch) and when it is clear to the controller 128 that such a phone call will not be made. After step 280, the method 200 will move to its completion.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to generate and transmit an emergency services request, the method comprising:
   receiving, at a controller, an output signal from a pedestrian collision detection sensor located in a bumper of a vehicle, the output signal produced after an object has collided with the vehicle bumper;
   computing, at the controller, a collision load based on the output signal from the pedestrian collision detection sensor;
   receiving, via the controller, an output signal from a velocity sensor located in the vehicle;
   computing, via the controller, a collision speed based on the output signal from the velocity sensor;
   generating, via the controller, an effective mass based on the computed collision load and the computed collision speed;
   verifying, via the controller, that the object is a pedestrian based on the generated effective mass;
   when the object is verified to be the pedestrian, via the controller, receiving vehicle location data from a vehicle location sensor;
   when the object is verified to be the pedestrian, via the controller, receiving basic vehicle information from a memory located in the vehicle;
   when the object is verified to be the pedestrian, via a controller, generating the emergency services request comprising the collision speed, the vehicle location data, and the basic vehicle information, wherein the emergency services request is configured to request help be provided to the pedestrian and to let a network participant know where the pedestrian was struck by the vehicle and how fast the vehicle was moving when the collision occurred; and
   transmitting, via the controller, the emergency services request.

2. The method of claim 1, wherein the controller is located in the vehicle.

3. The method of claim 1, wherein the emergency services request is sent to the network participant via a peer network.

4. The method of claim 3, wherein the network participant is an emergency services provider.

5. The method of claim 3, wherein the network participant is a call center.

6. The method of claim 1, wherein the emergency services request is transmitted after the vehicle has departed from where the pedestrian was struck by the vehicle and when the controller has yet to recognize that a vehicle occupant has called the network participant.

7. A system to generate and transmit an emergency services request, the system comprising:
   a memory configured to comprise one or more executable instructions and a processor configured to execute the executable instructions, wherein the executable instructions enable the processor to:
   receive an output signal from a pedestrian collision detection sensor located in a bumper of a vehicle, the output signal produced after an object has collided with the vehicle bumper;
   compute a collision load based on the output signal from the pedestrian collision detection sensor;
   receive an output signal from a velocity sensor located in the vehicle;
   compute a collision speed based on the output signal from the velocity sensor;
   generate an effective mass based on the computed collision load and the computed collision speed;
   verify that the object is a pedestrian based on the generated effective mass;
   when the object is verified to be the pedestrian, receive vehicle location data from a vehicle location sensor;
   when the object is verified to be the pedestrian, receive basic vehicle information from a memory located in the vehicle;
   when the object is verified to be the pedestrian, generate and transmit the emergency services request comprising the collision speed, the vehicle location data, and the basic vehicle information, wherein the emergency services request is configured to request help be provided to the pedestrian and to let a network participant know where the pedestrian was struck by the vehicle and how fast the vehicle was moving when the collision occurred; and
   transmit the emergency services request.

8. The system of claim 7, wherein the memory and the processor are located in the vehicle.

9. The system of claim 7, wherein the emergency services request is transmitted to the network participant via a peer network.

10. The system of claim 9, wherein the network participant is an emergency services provider.

11. The system of claim 9, wherein the network participant is a call center.

12. The system of claim 7, wherein the emergency services request is transmitted after the vehicle has departed from where the pedestrian was struck by the vehicle and when the processor has yet to recognize that a vehicle occupant has called the network participant.

13. A non-transitory and machine-readable medium having stored thereon executable instructions adapted to generate and transmit an emergency services request, which when provided to a controller and executed thereby, causes the controller to:
   receive an output signal from a pedestrian collision detection sensor located in a bumper of a vehicle, the output signal produced after an object has collided with the vehicle bumper;
   compute a collision load based on the output signal from the pedestrian collision detection sensor;
   receive an output signal from a velocity sensor located in the vehicle;
   compute a collision speed based on the output signal from the velocity sensor;
   generate an effective mass based on the computed collision load and the computed collision speed;

verify that the object is a pedestrian based on the generated effective mass;

when the object is verified to be the pedestrian, receive vehicle location data from a vehicle location sensor;

when the object is verified to be the pedestrian, receive basic vehicle information from a memory located in the vehicle;

when the object is verified to be the pedestrian, generate and transmit the emergency services request comprising the collision speed, the vehicle location data, and the basic vehicle information, wherein the emergency services request is configured to request help be provided to the pedestrian and to let a network participant know where the pedestrian was struck by the vehicle and how fast the vehicle was moving when the collision occurred; and transmit the emergency services request.

14. The non-transitory and machine-readable memory of claim 13, wherein the controller is located in the vehicle.

15. The non-transitory and machine-readable memory of claim 13, wherein the emergency services request is transmitted to an emergency services provider via a peer network.

16. The non-transitory and machine-readable memory of claim 13, wherein the emergency services request is transmitted to a call center via a peer network.

17. The non-transitory and machine-readable memory of claim 13, wherein the emergency services request is transmitted after the vehicle has departed from where the pedestrian was struck by the vehicle and when the controller has yet to recognize that a vehicle occupant has called the network participant.

* * * * *